United States Patent [19]
Bailiff

[11] Patent Number: 5,363,153
[45] Date of Patent: Nov. 8, 1994

[54] COMFORT ZONE HEATING APPARATUS FOR GLASSES OR THE LIKE

[76] Inventor: Clealen D. Bailiff, 25 Verde Hills, Center Point, Tex. 78010

[21] Appl. No.: 35,725

[22] Filed: Mar. 23, 1993

Related U.S. Application Data

[63] Continuation-in-part of Ser. No. 772,663, Oct. 7, 1991, abandoned.

[51] Int. Cl.⁵ .............................................. G02C 1/00
[52] U.S. Cl. ...................... 351/78; 351/132; 351/136; 351/158
[58] Field of Search .............. 351/158, 132, 136, 131, 351/138, 68, 88, 41, 78, 79, 80, 81; 2/446, 435

[56] References Cited

U.S. PATENT DOCUMENTS

| | | | |
|---|---|---|---|
| 381,260 | 4/1888 | Leighton | 351/158 |
| 408,151 | 7/1889 | Welcker | 351/158 |
| 411,689 | 9/1889 | Smith et al. | 351/158 |
| 575,658 | 10/1897 | Mayer | 351/158 |
| 666,731 | 1/1901 | Balme. | |
| 2,429,583 | 2/1947 | Ogle | 219/46 |
| 2,635,175 | 4/1953 | Hodge | 219/46 |
| 2,718,584 | 9/1955 | Hariu | 219/46 |
| 2,827,538 | 3/1958 | Polis et al. | 219/19 |
| 2,830,132 | 4/1958 | Borg | 351/158 |
| 3,140,390 | 7/1964 | Smith et al. | 351/158 |
| 3,160,735 | 12/1964 | Aufricht | 219/201 |
| 3,173,419 | 3/1965 | Dubilier et al. | 128/399 |
| 3,189,913 | 6/1965 | Hoffmaster | 351/130 |
| 3,701,592 | 10/1972 | Fernandez | 351/130 |
| 4,243,041 | 1/1981 | Paul | 128/402 |
| 4,704,015 | 11/1987 | Grendol et al. | 351/88 |
| 5,004,334 | 4/1991 | Miele | 351/54 |

Primary Examiner—William L. Sikes
Assistant Examiner—Hung Xuan Dang
Attorney, Agent, or Firm—Donald R. Comuzzi; Christopher L. Makay

[57] ABSTRACT

A facial heating apparatus is disclosed which mounts onto any eyeglasses in order to impart warmth to the sinus regions of the eyeglass wearer's head to facilitate the establishment of a comfort zone of temperature about the face and upper body of the wearer affected by the sinuses. The facial heating apparatus mounts to the underside of the eyeglasses and includes a nosepiece and a resistive element that electrically connects to a power source in order to impart heat to the eyeglass wearer's head. The facial heating apparatus further includes a pad to provide a soft cushion against the wearer's face when the facial heating apparatus is worn. The facial heating apparatus eliminates the need for different pairs of heated glasses because it is removable and interchangeable among a variety of different types of eyeglasses.

2 Claims, 1 Drawing Sheet

COMFORT ZONE HEATING APPARATUS FOR GLASSES OR THE LIKE

CROSS-REFERENCES TO RELATED APPLICATIONS

This application is a continuation-in-part application of application Ser. No. 07/772,663, filed Oct. 7, 1991, now abandoned.

BACKGROUND OF THE INVENTION

1. Field of the Invention

The present invention relates to an apparatus for warming facial areas of a wearer and, more particularly, but not by way of limitation, to an apparatus that removably attaches to eyeglasses, sunglasses, or the like to impart heat to the sinus regions of the wearer's head, thereby creating a comfort zone of temperature about the face and upper body affected by the sinuses.

2. Description of the Related Art

Persons who live in colder climates often experience considerable difficulty in keeping the face warm. For example, any outdoor activity performed in a cold climate such as skiing or just working exposes the face to both wind and cold and results in the loss of body heat through the unprotected face. As facial temperature lessens due to exposure, discomfort causing anywhere from minor to severe pain about the face and upper body may develop. Thus, it is highly desirable to apply heat to the face in order to prevent discomfort due to cold weather.

Devices do exist which supply heat about the face, however, those devices are primarily for either purported therapeutic uses or to prevent the fogging of eyeglass lenses. Such devices include U.S. Pat. No. 4,209,234, issued to McCooeye, which discloses eyeglasses provided with a heating circuit that applies current to a conductive film placed on the lenses, thereby heating the lenses to prevent their fogging.

U.S. Pat. No. 4,868,929, issued to Curcio, discloses a ski goggle which includes a protective lens provided with a fine grid of heat generating wires which produce sufficient heat through the lenses to remove frost and fog from them. An external battery pack and switching device supply the power to the wire grid.

U.S. Pat. No. 1,963,990, issued to Gilkeson, et al., discloses goggles designed with heating elements positioned about the lenses of the goggles such that a high temperature is maintained on the face of the lenses, thus preventing formation of fog, ice, and moisture on the lenses.

U.S. Pat. No. 3,160,735, issued to Aufricht, discloses anti-fogging eyeglasses wherein heating and accelerated ventilation of the eyeglass lenses, especially on their inner or eyeward surfaces, prevents condensation of moisture or evaporates moisture already condensed.

U.S. Pat. No. 3,140,390, issued to Smith, et al., discloses a therapeutical appliance which is an electrically heated spectacle-like frame positionable about and upon the eyes of a user to transfer heat to the eyes and eyelids, thereby relieving pain, discomfort or irritation caused by eye fatigue and to cure possible eye diseases responsive to heat therapy.

U.S. Pat. No. 411,689, issued to Smith & Martin, discloses a therapeutic electrical attachment for spectacles which generates a voltaic current through the nerves in the vicinity of the eyes in order to strengthen the sight and enable a wearer to continue reading for an increased time.

Although some of the above devices transfer heat to the facial areas, none are practical for cold climate outdoor use to create a comfort zone of temperature about the face and upper body affected by the sinuses. The therapeutic devices are specifically designed to apply either heat or current to the facial area about the eyes in order to relieve eye fatigue and irritation. Accordingly, those devices are for indoor use and, therefore, do not suggest an apparatus that easily and removably attaches to eyewear in order to heat the face when a wearer is outdoors in a cold climate.

With respect to the anti-fogging devices, those devices are specifically designed with internal heating elements that apply heat to the lenses but not necessarily to the face. Thus, because the heating elements are mounted within the eyeglass frame to heat the lenses, they often inefficiently and inadequately transfer heat to the face. Furthermore, anti-fogging devices are typically expensive because each one consists of eyeglasses manufactured with the heating elements mounted within the eyeglass frame. The above anti-fogging devices, therefore, do not suggest an inexpensive apparatus that easily and removably attaches to eyewear in order to heat the face when a wearer is in a cold outdoor environment.

Accordingly, the present invention provides an apparatus that removably attaches to a variety of eyeglasses, sunglasses, or the like in order to apply heat to the face and create a comfort zone of temperature about the face and upper body affected by the sinuses.

SUMMARY OF THE INVENTION

In accordance with the present invention, a facial heating apparatus, removably connected to a variety of eyewear such as eyeglasses, sunglasses, or the like, imparts warmth to the sinus regions of a wearer's head to form a comfort zone of heat about the face and upper body affected by the sinuses. The facial heating apparatus comprises a nosepiece which removably attaches to the underside of any eyewear to function as the lower support of the eyewear. The facial heating apparatus further comprises a resistive heating element mounted between the inside of the nosepiece and a pad which mounts to the inside of the nosepiece. The pad functions to isolate the heating element from the wearer's face and, also, to supply a soft cushion which provides a comfortable fit of the facial heating apparatus against the nose and cheek bone area of the wearer. The heating element mounts to the pad and the pad mounts to the nosepiece using any suitable means such as glue. The ends of the heating element electrically connect to a power source such as a battery or other self-contained power supply through a pair of wires.

In use, the nosepiece affixes to the underneath of eyewear to be worn. The eyewear user places the eyewear onto his face such that the nosepiece rests on the bridge of the nose and across the cheek bones. The wires couple the heating element to the power supply, resulting in current flowing through the heating element. Because the heating element is resistive, the current flow causes the temperature of the heating element and, thus, the pad to increase. Accordingly, the heating element transfers the heat it generates through the pad to the face of the wearer. More particularly, the heating element imparts warmth into the sinus areas about the nose and cheek bones. As a result of the heating the sinuses, the wearer feels a warm comfortable feeling about the face and upper body.

It is, therefore, an object of the present invention to provide a facial heating apparatus that is removably attachable to any eyewear.

It is another object of the present invention to provide a facial heating apparatus that imparts heat to the sinuses about the nose and cheek bones, thereby creating a warm comfortable feeling about the face and upper body of a wearer.

It is a further object of the present invention to provide a facial heating apparatus that is inexpensive to produce and interchangeable among a variety of different eyewear.

Still other features, objects, and advantages of the present invention will become event to those skilled in the art in light of the following.

DETAILED DESCRIPTION OF THE PREFERRED EMBODIMENT

Figure 1:
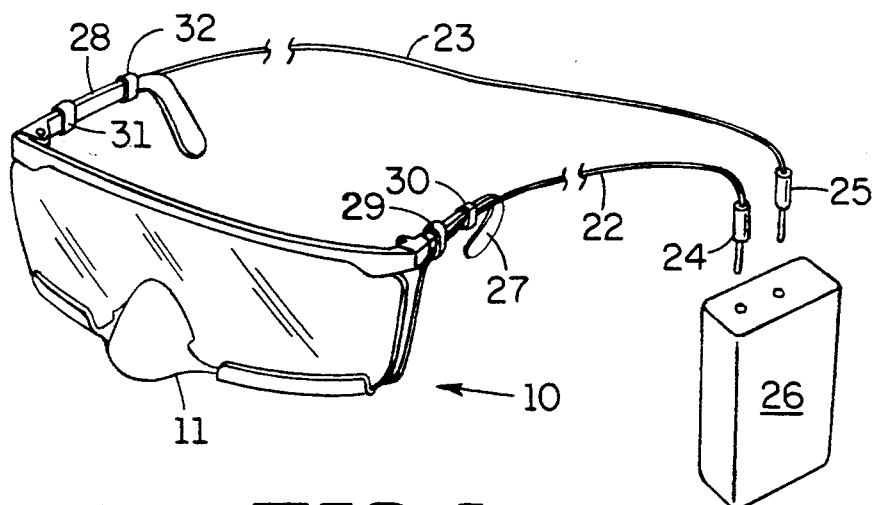
FIG. 1 is a perspective view depicting the facial heating apparatus according to the preferred embodiment of the present invention mounted on eyewear and connected to a power source.

As shown in FIG. 1, facial heater 10 mounts underneath any eyeglasses and connects to any conventional power source such as a battery to deliver heat to the front facial region of a wearer. Facial heater 10 comprises nosepiece 12, resistive element 13 and pad 14 (see FIG. 2). Any suitable hard material such as plastic may be utilized to fashion nosepiece 12. Nosepiece 12 is formed integrally as one piece and includes nosebridge 15, cheek rests 16 and 18, and lips 17 and 19. Cheek rest 16 and lip 17 define groove 20 (see FIG. 3), while cheek rest 18 and lip 19 define groove 21. Grooves 20 and 21 allow nosepiece 12 to be mounted to the underside of a pair of eyeglasses (described herein).

Resistive element 13 mounts to one side of pad 14 using any suitable means such as glue Additionally, each end of resistive element 13 connects to one of wires 22 and 23 using any suitable means such as soldered wire connectors or wire nuts. Resistive element 13 mounts onto one side of pad 14 such that it encompasses the largest amount of surface area, thereby providing the maximum allowable transfer of heat to the front facial region of the wearer.

Figure 2:
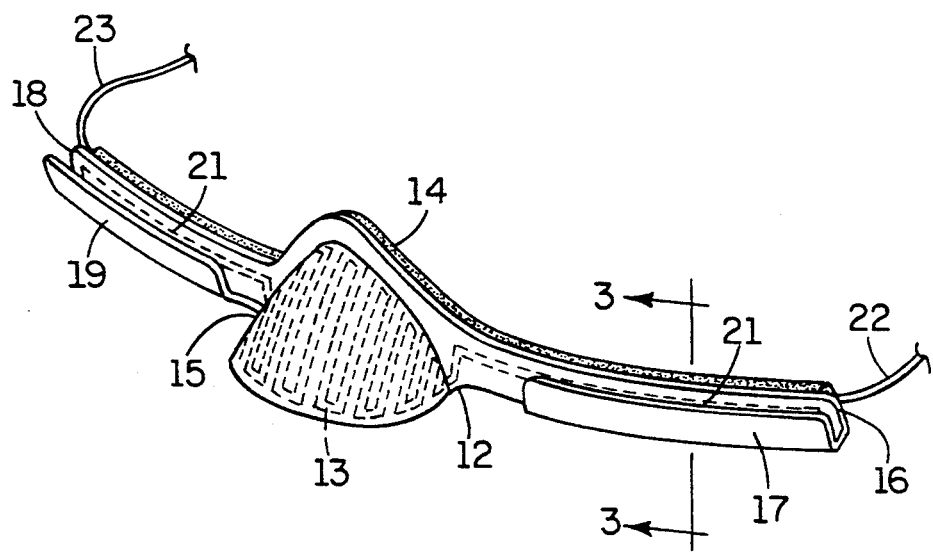
FIG. 2 is a perspective view depicting the facial heating apparatus according to the preferred embodiment of the present invention.
Figure 3:
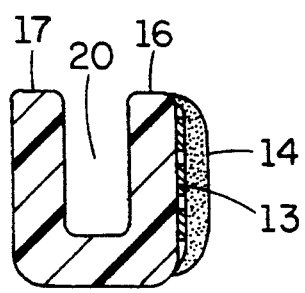
FIG. 3 is a cross-sectional view of the facial heating apparatus according to the preferred embodiment of the present invention taken along lines 3—3 of FIG. 2.

The side of pad 14 containing resistive element 13 then mounts to the inside of nosepiece 12 using any suitable means such as glue (see FIG. 2). Pad 14 functions to provide a soft comfortable cushion between nosepiece 12 and the front facial region of the wearer. Pad 14, essentially, allows nosepiece 12 to closely and comfortable fit about the nose and cheeks of the wearer of facial heater 10.

Wires 22 and 23 connect to electrical leads 24 and 25, respectively, using any conventional means such as soldering to allow the connection of resistive element 13 to battery 26. Furthermore, to prevent wires 22 and 23 from interfering with the eyeglass wearer they connect to temporal members 27 and 28, respectively, using any suitable means such as wire ties 29–32.

To mount facial heater 10 to eyeglasses, an eyeglass wearer forces the underside of his eyeglasses into grooves 20 and 21 until nosepiece 12 remains firmly secured to the underside of the eyeglasses (see FIG. 1). Specifically, cheek rests 16 and 18 and lips 17 and 19 clamp the underside of the eyeglasses within their respective grooves 20 and 21, thereby holding nosepiece 12 in place. Once nosepiece 12 is mounted, wire ties 29–32 secure wires 22 and 23, respectively, temporal members 27 and 28 of the eyeglasses. Finally, the wearer places the eyeglasses on his face and connects electrical leads 24 and 25 to battery 26 via electrical leads 24 and 25. Consequently, battery 26 supplies power to resistive element 13 which heats up to transfer warmth to the sinus region of the wearer's head, resulting in a comfort zone of temperature being established about the face and upper body affected by the sinuses.

Although the present invention has been described in terms of the foregoing embodiment, such description has been for exemplary purposes only, and, as will be apparent to those of ordinary skill in the art, many alternatives, equivalents, and variations of varying degrees will fall within the scope of the present invention. That scope, accordingly, is not to be limited in any respect by the foregoing description, but rather, it is defined only by the claims which follows.

I claim:

1. An apparatus capable of being removably attached to eyewear for imparting heat to the front facial region of an eyewear wearer, comprising:

a nosepiece, said nosepiece including means for removably attaching said nosepiece to said eyewear;

a pad affixed to one side of said nosepiece for providing a cushion between said nosepiece and the front facial region of said eyewear wearer; and a resistive element affixed to said cushion and positioned between said cushion and said nosepiece, said resistive element being electrically connected to a power source for imparting heat to the front facial region of said eyewear wearer.

2. The apparatus according to claim 1 wherein said means for removably attaching said nosepiece to said eyewear comprises a first cheek rest and lip defining a groove therebetween, and a second cheek rest and lip defining a groove therebetween.

* * * * *